March 21, 1939.   E. LITTMANN   2,151,520
ANTISKID CHAIN
Filed March 19, 1938   2 Sheets-Sheet 1
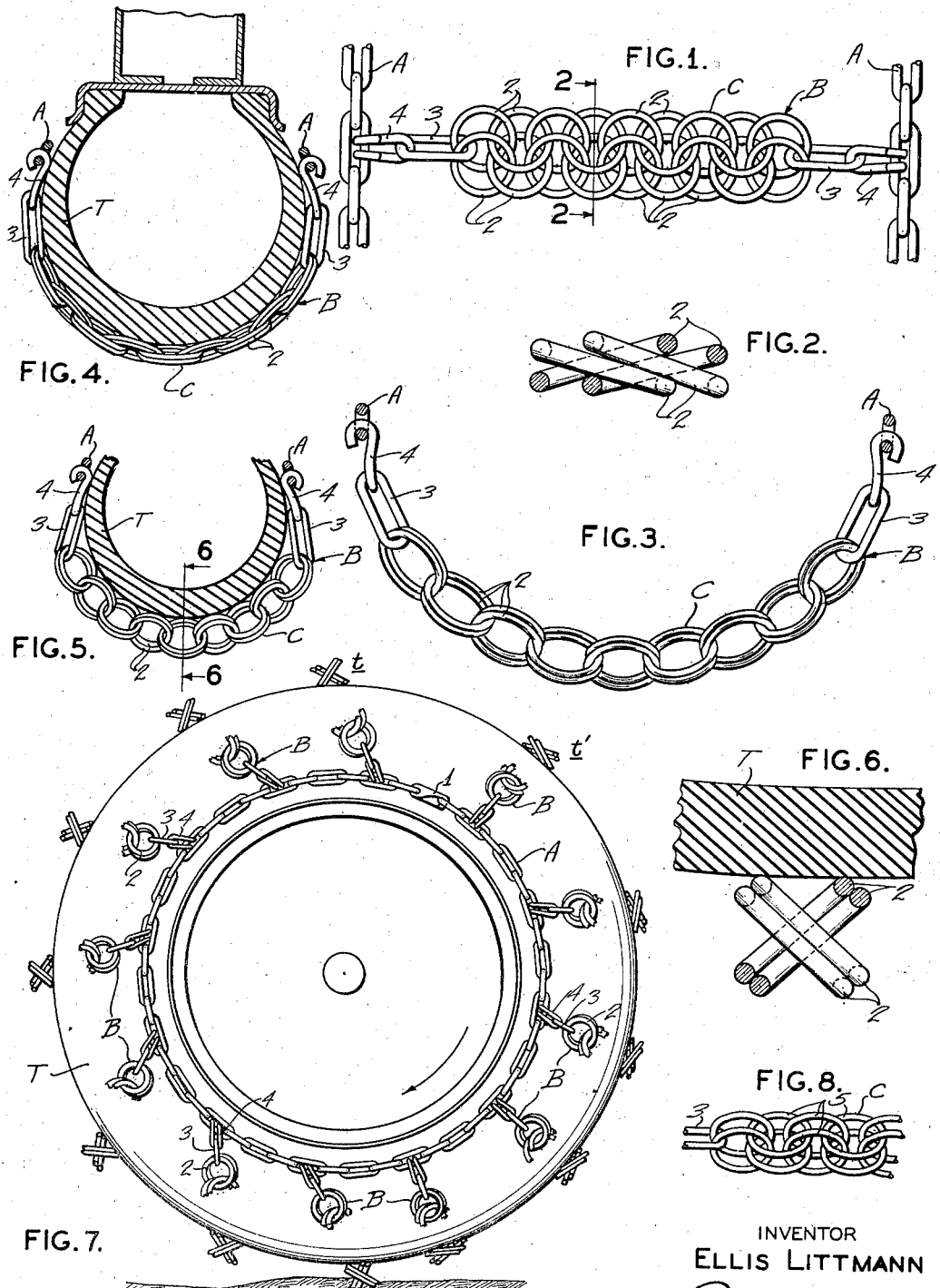
INVENTOR
ELLIS LITTMANN
BY Ralph Kalish
ATTORNEY March 21, 1939. E. LITTMANN 2,151,520
ANTISKID CHAIN
Filed March 19, 1938 2 Sheets-Sheet 2

INVENTOR
ELLIS LITTMANN
BY Ralph Kalish
ATTORNEY

Patented Mar. 21, 1939

2,151,520

UNITED STATES PATENT OFFICE 2,151,520

ANTISKID CHAIN

Ellis Littmann, Clayton, Mo., assignor to Nixdorff-Krein Manufacturing Co., St. Louis, Mo., a corporation of Missouri Application March 19, 1938, Serial No. 196,951

9 Claims. (Cl. 152—239)

This invention relates in general to certain new and useful improvements in traction-chains.

Automotive and other types of vehicles, when driven over wet, icy, muddy, or otherwise hazardous roadways, and particularly so-called heavy duty vehicles, such as trucks, tractors, and the like, working under extreme and abnormal tractive conditions, such as muddy fields, ditches, and road grading work, should preferably be equipped with traction-increasing means, such, for instance, as anti-skid chains. Anti-skid or traction chains, however, very quickly become clogged or caked with mud and clay especially under abnormal conditions of the type mentioned, with the resulting production of a tightly bonded annular ring of slippery material, which actually has the effect of increasing the diameter of the tire and substantially destroys traction, thereby permitting the wheels to spin freely.

In addition, it has been found that chains used for this purpose are exposed to abrasive conditions, which, contrary to ordinary expectations, actually wear away the chain-links much more rapidly than ice or snow.

Further, most construction locations, road grading operations, and farms at the present time are located in proximity to concrete or other types of improved highways on which the use of lugs or other rigid projecting members tending to nick, pit, or otherwise damage the road surface is prohibited. All types of presently available tractive equipment, so far as I am aware, must for this reason be removed during travel along improved highways.

My invention hence has for its primary objects the provision of an anti-skid traction chain, which is simple and economical in cost and construction, which is capable of producing an unusually great amount of tractive effect under the most extreme conditions, which actually moves upon itself in the course of its operation in a "self-cleaning" action, as it may be called, and, therefore, does not become clogged or caked, which is interconnected in its various parts for continuously varying the surfaces exposed to abrasive wear, so as to distribute the abrasive wear uniformly over the entire structure, which will automatically and selectively provide varying degrees of tractive effect responsive to conditions requiring such tractive effect and will, nevertheless, lie in substantially smooth flat relation on the wheel or tire when moving over concrete or other types of improved roads, and which is highly efficient in the performance of its stated functions.

And with the above and other objects in view, my invention resides in the novel features of form, construction, arrangement, and combination of parts presently described and pointed out in the claims.

In the accompanying drawings (2 sheets),

Figure 1 is a fragmentary plan view of an antiskid or traction chain constructed in accordance with and embodying my invention, showing in particular a single cross-link unit in non-tractive position;

Figure 2 is a vertical sectional view of the chain, taken approximately along the line 2—2, Figure 1;

Figure 3 is a perspective view of a cross-chain of my present invention;

Figure 4 is a transverse sectional view of a vehicle-tire equipped with the anti-skid or traction-chain and particularly showing the traction-chain in position to afford minimum tractive effect;

Figure 5 is a transverse sectional view of a vehicle tire equipped with the anti-skid or traction-chain and particularly showing the traction-chain in position to afford maximum tractive effect;

Figure 6 is a fragmentary sectional view of the cross-chain, taken approximately along the line 6—6, Figure 5;

Figure 7 is a side elevational view of the antiskid or traction-chain, showing the chain in operative position upon a vehicle wheel;

Figure 8 is a fragmentary plan view of a modified form of cross-link of my present invention.

Figure 9:
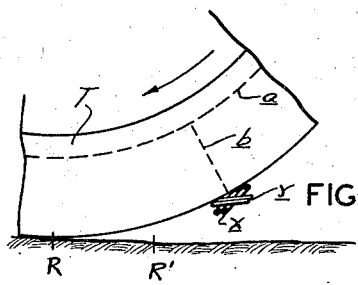
Figures 9 to 16, inclusive, are schematic views, illustrating the various positions of the chainlink in actual operation.

Referring now in more detail and by reference characters to the drawings, which illustrate a preferred embodiment of my present invention, the chain comprises a pair of initially parallel so-called side members A constructed in any conventional manner and each equipped at its respective extremities with suitable chain securing latches or lock-members 1, which also may be of any conventional design or pattern.

Disposed transversely between the side chains A and at preferably uniformly spaced intervals therealong, is a series of normally parallel cross-chains B, each including a central tractive section C made up of a plurality of interlinked pairs of peripherally registering, preferably circular links or rings 2, as best seen in Figure 3.

The tractive section C may be formed either mechanically or by hand, although I have found it most convenient to fabricate the same by initially forming the desired number of unwelded and partially opened-out or split rings which may ultimately be pressed together to close the split or gap portion, and then butt-welded in the formation of a closed link or ring. Two such split rings are initially closed and welded to form complete links in the manner just described and are thereupon concentrically superposed so as to lie in peripheral registration one against the other. A second pair of split and unwelded rings are then concentrically superposed, hooked through the first pair of rings, and then each pressed together and separately welded in link formation. A third pair of rings is similarly interlinked with the second pair of rings, and this process is continuously repeated until a sufficient number of ring-pairs have been thus interlinked to form the desired length of chain. The end pairs of rings 2 of the tractive section C are then provided with single preferably elongated connector links 3, which are, in turn, conventionally looped through the bight portion of hook links 4, by which the cross-chain B is conventionally secured to the side-chains A.

I have also found that similarly satisfactory results may be obtained by utilizing cross-chains formed of links having other than circular or ring-like contour, such as, for instance, the elliptically shaped rings 5, as best seen in Figure 8.

In actual operation, the traction chain may be installed on the tire or vehicle wheel in the conventional manner.

When the wheel is stationary, the cross-chains B will extend arcuately across the outer face of the tire in the usual manner under relatively reduced tension, and the tractive sections C will assume the flattened out or mesh-like position illustrated in Figures 1, 2, and 4. It will be evident in this connection that, as the tractive section C assumes such flattened out or mesh-like position, the rings 2 will all move more or less toward each other, thereby somewhat longitudinally shortening the cross-chains B and causing them to encircle the tire along a substantially radial line.

When the tire is moving over a muddy or soft road surface, each cross-chain B successively undergoes a series of unique movements which may best be understood by reference to Figures 9 to 13, inclusive. In this series of schematic views, T designates a section of the tire. The position of the side chain is indicated by the arcuate dotted line a, and the relative position of the cross-chain is indicated by the dotted line b. For the purposes of these illustrations, only two pairs of interlinked cross-chain rings x, y, are shown in side elevation.

As the tire T moves over the point R along the road, the particular cross-chain under consideration will assume a radial encircling position around the tire, as indicated by the radial position of the dotted line b, and the rings x, y, will be in flattened out or mesh-wise position, as above pointed out. As the time moves over the point R', the lowermost points of the rings x will just begin to touch the top surface of the road. At this instant, however, the cross-chain will still lie along the radial line, as indicated at b, and the links will remain in the flattened out or mesh-like position. Assuming that the roadway at the point R' is slippery and that the traction between the tire tread and the roadway is insufficient to sustain forward movement of the vehicle, the tire will then begin to slip or "spin", as it is called, and undergo a marked acceleration in circumferential speed. The side chains A, which are in fairly tight frictional engagement with the side walls of the tire, will move with the tire at the accelerated rate of speed. The cross-chain, however, being in engagement with the surface of the roadway, will tend to maintain the initial circumferential speed, thereby causing the cross-chain to swing out of radial position to the more or less angular position, as indicated at b in Figure 11. As the cross-chain assumes this non-radial or angular position, it must necessarily undergo an elongated longitudinal stress which causes the respective rings or links 2 of the pairs of links x, y, as well as all of the pairs of links 8 of the cross-chain to rotate axially around certain selected diameters, thereby bringing the pairs of links out of the above-mentioned flattened or mesh-like position into an angularly disposed position, such that the circumferential plane of any selected pair of rings will be disposed at approximately an angle of 90° to the circumferential plane of any adjacent pair of rings.

Figure 11:
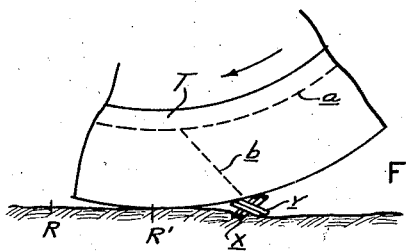
Figure 13:
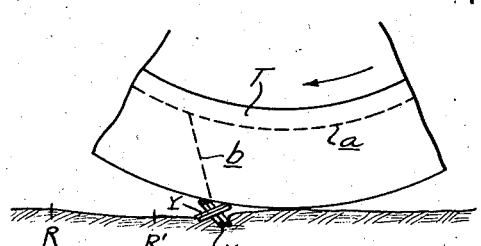

It will, therefore, be evident that at the moment of tire slippage, the above described axial turning effect, together with all the other forces which are brought to bear upon the pair of rings x, for instance, will cause this pair of rings x to swing upwardly toward vertical position and consequently dig into the soft road surface, as illustrated in Figure 11. When the pair of links x has dug into the road surface sufficiently to create traction, the tire T will again take up forwardly rolling movement by riding upwardly and over the uppermost points of the pair of links x. As the tire continues its forward motion, the pair of links x will tend to pivot about their lowermost points, which are in road engagement and shift into the position shown in Figure 13. By reference to Figure 9, it will be noted that as the particular cross-chain approaches ground engagement, the link pair x is in position for initial ground engagement or, as it might be termed, "lead" position. After the pair of links x have passed through the position of ground engagement, this particular pair of rings will now be in reversed relationship and the pair of rings y will assume the so-called lead position, as best seen in Figure 13. It will hence be evident from this explanation that the cross-chain actually undergoes an axial rotation during each operative ground-gripping cycle.

Figure 14:
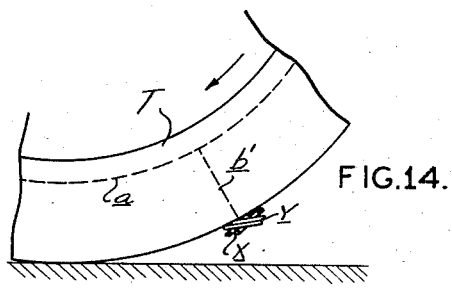
Figure 10:
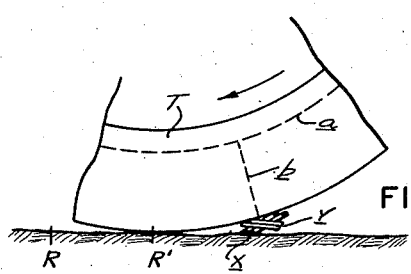
Figure 15:
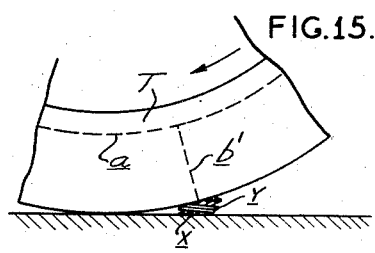
Figure 16:
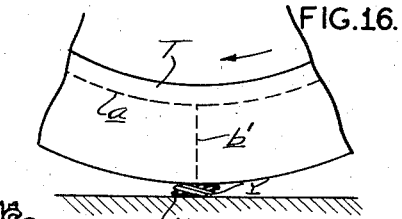
Figure 12:
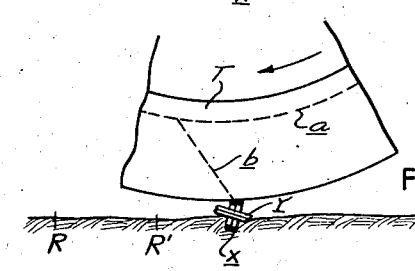

Subsequently, as each cross-chain B leaves the ground again and moves upwardly with the tire, it will become loosened as it reaches the top and the component links 2 will slide laterally with respect to each other, gradually assuming the more or less flattened or mesh-like position shown in Figures 1 and 2. As each cross-chain B reaches the top of the wheel, that is to say, the position indicated at t in Figure 7, it will swing outwardly and forwardly under the influence of centrifugal force through the more or less radial position t', during which rotation the links will again rotate axially with respect to each other, so that the pair of links x, for instance, will again assume lead position. If, on the other hand, the tire T is moving along a hard surface, such as a concrete road, for instance, the links 2 of the cross-chain B will assume the flattened out or mesh-like position and will maintain this position as the link is crushingly rolled between the road surface and the tire during rotation of the latter, all as best seen in Figures 14, 15, and 16. It will be noted that, as the pair of links $x$ approach the surface of the road, the cross-chain will lie in radial position, as indicated in dotted lines at $b'$. When the lowermost point of the links $x$ engages the hard surface of the road, there will be no slippage or spinning of the wheel. Therefore, there will be no tendency for the cross-chain to swing out of its normal radial position and hence there will be no elongating force imposed upon the links. The tire T will accordingly roll smoothly forwardly over the links of the cross-chain and the relatively small bump or shock caused thereby will be pneumatically absorbed or cushioned in the tire.

The so-called axial rotation of the cross-chain upon itself accomplishes two distinct results. First, it materially increases the tractive effect of the chain far beyond that obtainable by any other known and existing structure, so far as I am aware. Second, it produces a relative slipping movement of the cross-chain links with respect to each other during each revolution of the wheel, which slipping movement loosens and disintegrates the clinging and caked particles of mud or clay normally picked up by the cross-link as it bites into the ground, thereby introducing a sort of "self-cleaning" action, as it may be termed. Actual experimental trials with tractor equipment in wet plowed ground for sustained periods of time have shown that traction chains of my present invention are capable of supplying tractive effect far in excess of the tractive effect supplied by any other available type of anti-skid or traction chain. These experimental trials have also demonstrated that the so-called "self-cleaning" action is absolute and positive in character and that the traction chain of my present invention will not clog up or become caked.

Figure 17:
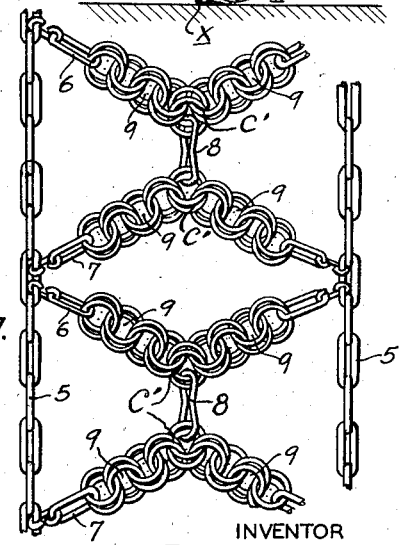
Figure 17 is a modification of applicant's chain as shown in Figure 1.

If desired, traction chains of the so-called "X cross-link" type may also be constructed in accordance with and embodying my present invention. Thus I may provide a pair of conventional side chains 5 provided with a plurality of pairs of cross-chains 6, 7, each being substantially longer than the desired transverse width between the side chains 5 and having a double-ringed traction section C'. Each of the cross-chains 6 is centrally connected through a double-lobed center link 8 to the cross-chain 7 of the next succeeding pair in X-shaped formation, as best seen in Figure 17, in which case each cross-chain unit includes four link members 9 corresponding to the four legs of the letter "X" and separately functioning in substantially the same manner as the entire tractive section C above described.

Another feature of the present invention, which has been experimentally observed, is the peculiar tendency of the cross-chain rings or links not only to slide laterally with respect to each other, but also to turn rotatively about their own centers. This turning action is comparatively slow and continuous and is of such a nature that the points of contact between the interlinked pairs of rings are constantly changing, thereby distributing the wear uniformly over the entire surface of the ring rather than at certain points in the links, materially prolonging the life of the chain.

It has further been found that chains constructed in accordance with the present invention will move relatively to the tire during actual rotation thereof or "creep", as it is termed, to a much greater degree than previous types of traction chains. This so-called creeping effect is very essential in reducing wear and abrasion of the outer surface of the tire, thus materially prolonging the life thereof.

It should be understood that changes and modifications in the form, construction, arrangement, and combination of the several parts of the anti-skid chain may be made and substituted for those herein shown and described without departing from the nature and principle of my invention.

Having thus described my invention, what I claim and desire to secure by Letters Patent is,

1. As an article of manufacture, a traction chain having a plurality of parallel side chains, and a plurality of cross-chains operatively connected to the side chains, said cross-chains each including a plurality of interlinked sets of peripherally registering ring-like members.

2. As an article of manufacture, a traction chain having a plurality of parallel side chains, and a plurality of cross-chains operatively connected to the side chains, said cross-chains each including a plurality of pairs of interlinked ring-like members.

3. As an article of manufacture, a traction chain having a plurality of parallel side chains, and a plurality of cross-chains operatively connected to the side chains, said cross-chains each including a plurality of pairs of overlying links, each pair being interlinked through another pair for axially shiftable as well as rotatable movement with respect thereto.

4. As an article of manufacture, a traction chain having a plurality of parallel side chains, and a plurality of cross-chains operatively connected to the side chains, said cross-chains each including a plurality of pairs of overlying circular links.

5. As an article of manufacture, a traction chain having a plurality of parallel side chains, and a plurality of cross-chains operatively connected to the side chains, said cross-chains each including a plurality of pairs of overlying links, each pair being interlinked through another pair, said links further being arranged for lateral shifting movement with respect to each other.

6. In a device of the character described, a cross-chain including a plurality of interlinked pairs of overlying links.

7. In a device of the character described, a cross-chain including a plurality of interlinked pairs of peripherally registering ring-members.

8. In a device of the character described, a cross-chain including a plurality of interlinked pairs of overlying links arranged for lateral shifting movement with respect to each other.

9. As an article of manufacture, a traction chain having a plurality of parallel side chains, and a plurality of cross-chains operatively connected to the side chains and disposed at spaced intervals therealong, each of the cross-chains including an intermediate section of traction chain comprising a plurality of rings having relatively large over-all diameter with respect to the cross-sectional diameter, said rings being arranged in pairs in superposed peripheral registration, said pairs being interlinked in the formation of said traction chain section.

ELLIS LITTMANN.